United States Patent [19]

Kalopissis et al.

[11] 3,915,635

[45] Oct. 28, 1975

[54] HAIR COMPOSITIONS CONTAINING COLORED COPOLYMERS

[75] Inventors: Gregoire Kalopissis; Andre Viout, both of Paris, France

[73] Assignee: L'Oreal, Paris, France

[22] Filed: June 14, 1974

[21] Appl. No.: 479,597

Related U.S. Application Data

[63] Continuation of Ser. No. 163,416, July 16, 1971, abandoned, which is a continuation-in-part of Ser. No. 748,580, June 12, 1968, abandoned.

[30] Foreign Application Priority Data

June 15, 1971 United Kingdom............... 27753/71

[52] U.S. Cl. ......... 8/10.1; 424/DIG. 1; 424/DIG. 2; 424/47; 424/71
[51] Int. Cl.² .......................................... A61K 7/13
[58] Field of Search............ 424/DIG. 1, DIG. 2, 71; 8/10, 11, 10.1, 10.2

[56] References Cited
UNITED STATES PATENTS

| | | | |
|---|---|---|---|
| 2,632,004 | 3/1953 | Minsk et al. ........................ | 260/152 |
| 2,732,382 | 1/1956 | Minsk et al. ..................... | 260/152 X |
| 3,567,678 | 3/1971 | Kalopissis ........................ | 8/10.2 X |

*Primary Examiner*—Albert T. Meyers
*Assistant Examiner*—Dale R. Ore
*Attorney, Agent, or Firm*—Cushman, Darby & Cushman

[57] ABSTRACT

Hair setting lotion and hair lacquer compositions contain in an aqueous or alcoholic solvent a colored copolymer of a first monomer such as itaconic, methacrylic, citraconic or acrylic anhydride with a second monomer such as maleic anhydride, vinyl acetate, methylacrylate or isobutylvinylether. The polymer has condensed on the anhydride functions thereof n-butyl alcohol and a dye such as an azo, anthraquinone or benzene dye. The colored polymer in the hair setting lotion which can also contain a lower alkanol is present in amounts of 0.5–6% by weight while the colored polymer in the hair lacquer composition is present therein in amounts of 1.5–20% by weight. The latter composition is generally in the form of an aerosol preparation.

9 Claims, No Drawings

HAIR COMPOSITIONS CONTAINING COLORED COPOLYMERS

This is a continuation, of application Ser. No. 163,416 filed July 16, 1971 which in turn is a continuation-in-part of S.N. 748,580, filed June 12, 1968, both are now abandoned.

One type of known cosmetic product consists of colored resins comprising polymers to which colorants of various kinds are attached by chemical bonds.

Such colored resins have, in particular, been suggested for use in setting lotions or in colored aerosol hair lacquers which, after evaporation of the solvent or carrier, leaves a sheath of resin on the hair, thus making it possible to color the hair at the same time that it is held in a desired shape.

The cosmetic properties of the colored resins used, i.e., flexibility, sheen, resistance to humidity, coloring power, etc., depend to a large extent on the structure of the carbon chain to which the colorant is attached and more specifically, on the nature of the various groups making up the polymer.

The present invention relates to new colored polymers which make it possible to prepare setting lotions and aerosol lacquers and which comprise groups which vary widely in nature, so as to permit the selection of the polymeric structure to be made to suit the particular cosmetic properties which are desired.

More particularly the present invention relates to a cosmetic composition for the hair having a pH ranging from about 6 – 8 comprising a solution in a solvent selected from the group consisting of water, lower alkanol and mixtures thereof of a colored copolymer of a first monomer selected from the group consisting of itaconic anhydride, methacrylic anhydride, citraconic anhydride and acrylic anhydride with a second monomer selected from the group consisting of maleic anhydride, vinyl acetate, methyl acrylate and isobutyl vinylether, the weight percent of said first monomer in said copolymer ranging from about 25–56.3 percent, the weight percent of said second monomer in said copolymer ranging from about 43.7–75 percent, said copolymer having a molecular weight ranging from about 600–8,000, said copolymer having condensed on a portion of the anhydride functions thereof a dye selected from the group consisting of azo, anthraquinone and benzene dyes containing an extra nuclear radical having the formula

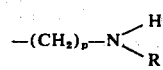

wherein $p$ is 2–6 and R is selected from the group consisting of hydrogen, —$CH_3$ and —$C_2H_5$, said extra nuclear radical being bonded to the aromatic nucleus of said dye through a nitrogen atom directly attached to said aromatic nucleus and said dye being bonded to said copolymer by an amide bond through the terminal nitrogen atom of said extra nuclear radical. The amount of the dye condensed on the copolymer is sufficient to color the copolymer and is sufficient so that the resulting colored copolymer effectively colors the hair. The copolymer also has n-butyl alcohol condensed by esterification on the remaining anhydride functions of the copolymer.

Suitable dyes usefully employed for condensation on said copolymer to produce the colored copolymer incorporated into the cosmetic composition of this invention are those having the formula

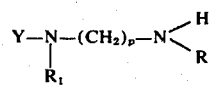

wherein $p$ is 2–6, R and $R_1$ are hydrogen —$CH_3$ or —$C_2H_5$ and Y represents the aromatic nucleus of an azo, anthraquinone or benzene dye. Representative of such dyes are anthraquinone dyes selected from the group consisting of:

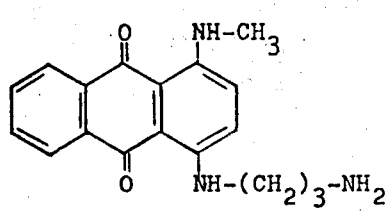

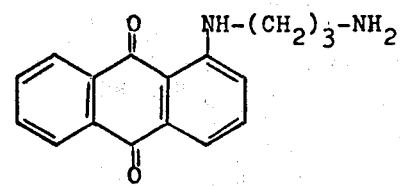

and

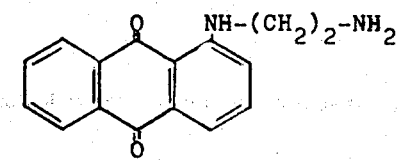

Representative benzene dyes are those selected from the group consisting of:

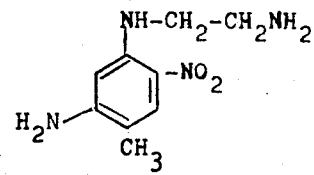,

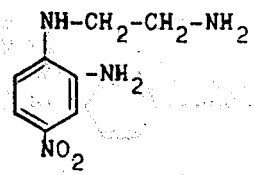,

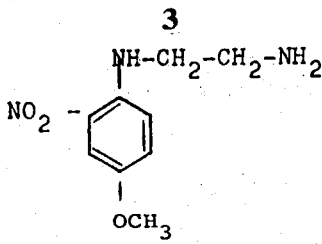

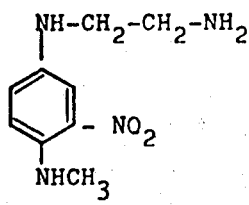

and

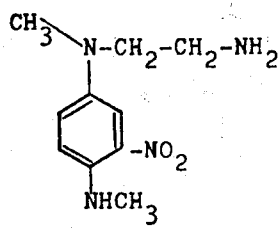

Representative azo dyes include the following:

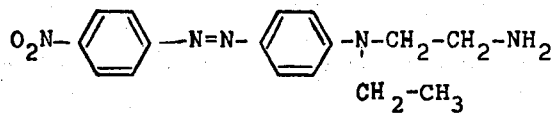

and

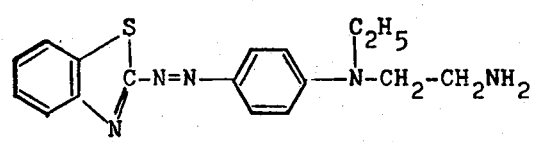

One method of preparing the colored copolymers utilized in the cosmetic compositions of this invention comprises the steps of first copolymerizing said first and second monomers, after which the dye and n-butanol are condensed on the resulting copolymer.

In an alternative process, unsaturated di-acid monomers derived from the above-described anhydride monomers are used in the polymerization step, said di-acid groups being then transformed into acid anhydride groups to which the dyes and alcohols corresponding to the desired polymer are attached by amidification and esterification, respectively.

In yet another process the dye and the alcohol can be attached to said unsaturated anhydride monomers and said monomers subsequently polymerized.

One object of the present invention is to provide the new article of manufacture which comprises a hair setting lotion comprising at least one colored polymer as hereinbefore described in an aqueous lower alkanol solution, a mineral or organic base in amounts sufficient to neutralize the free carboxylic acid functions of the polymer, and generally in amounts sufficient to achieve about 50–150% of stoichiometric neutralization.

Representative bases which can be used to neutralize the free carboxylic acid functions of the colored copolymer include monoethanol amine, diethanolamine, triethanolamine, isopropanolamine, morpholine, 2-amino-2-methyl 1-propanol, 2-amino-2-methyl 1,3-propanediol, diisopropanolamine, triisopropanolamine and aminoethyl propanediol.

Generally the amount of dye condensed on the colored copolymer used in producing the hair setting lotions of this invention ranges between about 2.75 to 9.5 percent by mole of the anhydride functions thereof.

When the hair setting lotion composition comprises an aqueous lower alkanol solution of the colored copolymer, the lower alkanol is generally present in amounts of about 20–70 weight percent of the composition and the lower alkanol is, preferably, ethanol or isopropanol.

Another object of the invention is to provide a sprayable aerosol hair lacquer which comprises an alcoholic solution containing at least one colored polymer as described above, said solution being packaged in an aerosol container together with a liquefied aerosol propellant under pressure, e.g., one or more of the halogenated hydrocarbons sold under the trademark "Freon". Representative of such aerosol propellants are dichlorodifluoromethane, trichloromonofluoromethane and their mixtures.

The aerosol hair lacquer composition can also contain a neutralizing agent as defined above to neutralize the free carboxylic acid functions of the colored copolymer. Further the amount of dye condensed on the anhydride functions of colored copolymer used in producing the hair lacquer compositions is generally the same as that condensed on the polymer used to prepare the hair setting lotions of this invention, the remainder of the anhydride functions being condensed with n-butyl alcohol.

In preparing the hair lacquer compositions, representative lower alkanols include ethanol and isopropanol. The alcoholic solution is generally present in amounts of about 25–33 weight percent of the sprayable aerosol composition, the remainder being essentially the aerosol propellant. Generally, the colored copolymer is present in amounts of about 1.5–20 weight percent of said alcoholic composition.

The following Examples illustrate the present invention.

EXAMPLE 1

Preparation of a colorless maleic anhydride — itaconic anhydride copolymer

The following materials are introduced into a one-liter flask equipped with stirring means, a reflux condenser, a thermometer, a dropping funnel, and a tube for introducing nitrogen:

| | |
|---|---|
| maleic anhydride | 60 g |
| itaconic anhydride | 60 g |
| distilled benzene | 300 c |

This mixture is brought to reflux and a solution containing 24g of benzoyl peroxide in 200 cc of benzene is introduced drop by drop over a 24-hour period.

The copolymer thus formed is dried, washed in pentane, and again dried. The result is a white powder.

The yield of the reaction by weight is 85%.

The anhydride index of the resulting product is 1070 — the theoretical index being 1072. The copolymer comprises 50 weight percent maleic anhydride and 50 weight percent itaconic anhydride and has a molecular weight of 600.

EXAMPLE 2

Preparation of uncolored maleic anhydride — methacrylic anhydride copolymer

The following ingredients are placed in a one-liter flask equipped with agitating means, a reflux condenser, a thermometer, a dropping funnel, and a tube for introducing nitrogen:

| | |
|---|---|
| maleic anhydride | 75 g |
| distilled benzene | 240 cc |
| benzoyl peroxide | 5.882 g |

This mixture is brought to reflux and 25g of methacrylic anhydride is added drop by drop over a period of 12 hours.

The polymer thus formed is filtered, washed with pentane, and dried.

The yield of the reaction is 60% by weight.

The anhydride index of the resulting product is 1046 — the theoretical index being 1040. The resulting copolymer comprises 25 weight percent methacrylic anhydride and 75 weight percent maleic anhydride and has a molecular weight of 700.

EXAMPLE 3

Preparation of a mixed semi-amide semi-ester colored polymer by condensing n-butyl alcohol and a dye responding to the formula

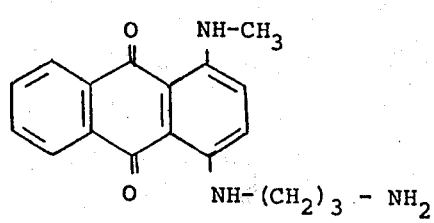

75 cc of anhydrous dimethyl formamide, 22.6 g (0.2 mol anhydride function) of the maleic anhydride-itaconic anhydride copolymer prepared according to Example 1, 6.8 g (0.02 mol) of the dye responding to the above formula, and 13.2 g (0.18 mol) of n-butanol are placed in a flask provided with agitating means, a thermometer, and a reflux condenser. This mixture is heated at reflux for 16 hours. Esterification is completed by adding 14.6 g (0.2 mol) of n-butanol and the mixture is again heated at reflux for 7 hours.

An equal volume of dioxane is added to the reaction mixture and the colored copolymer formed is precipitated with ether. After drying, the yield is 60% by weight of a deep violet powder.

Analyses have shown that the yield in terms of bonding of the dye by amidification is 95%.

EXAMPLE 4

Preparation of a colored mixed semi-amide semi-ester polymer by condensing on the uncolored polymer of example 2 both n-butyl alcohol and a dye responding to the formula

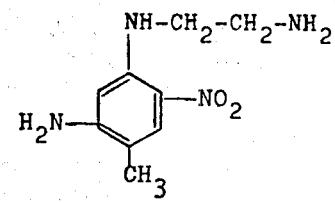

10.7 g (0.1 mol anhydride function) of a methacrylic anhydride/maleic anhydride copolymer prepared as in Example 2, 35 cc of anhydrous dimethyl formamide, 2.10 g (0.01 mol) of the above dye, and 6.6 g (0.09 mol) of n-butanol are introduced into a flask provided with agitating means, a thermometer and a reflux condenser. This is heated at reflux for 16 hours. Esterification is completed by adding 7.4 g (0.1 mol) of n-butanol and the mixture is then heated at reflux for 7 hours.

An equal volume of anhydrous dioxane is added to the reaction mixture and the colored copolymer is precipitated with dry ether. After drying, the result is a yield of 50% by weight of a mustard yellow powder.

Analyses have shown that the yield in terms of bonding of the dye by amidification is 27.5%.

EXAMPLE 5

Preparation of a colorless vinyl acetate — citraconic anhydride copolymer

The following ingredients are placed in a one-liter flask equipped with agitating means, a reflux condenser, a thermometer, and a tube for introducing nitrogen:

| | |
|---|---|
| vinyl acetate | 50 g |
| citraconic anhydride | 50 g |
| distilled toluene | 233 cc |
| benzoyl peroxide | 5.882 g |

This mixture is brought to reflux under nitrogen atmosphere while stirring. The copolymer formed precipitates from the toluene. After 8 hours the operation is terminated.

The precipitated polymer is dried, washed with petroleum ether, and dried.

The copolymer is in the form of a powder.

The yield of the reaction, by weight, is 86%.

The anhydride index of the end product is 563.5, the theoretical index being 500. It follows that the resulting copolymer comprises 43.7% vinyl acetate and 56.3% citraconic anhydride by weight and has a molecular weight of 2443.

EXAMPLE 6

Preparation of a colorless isobutylvinyl ether — itaconic anhydride copolymer.

The following ingredients are placed in a one-liter flask equipped with agitating means, a reflux condenser, and a tube for introducing nitrogen.

| | |
|---|---|
| isobutylvinyl ether | 50 g |
| itaconic anhydride | 50 g |
| distilled toluene | 233 cc |
| benzoyl peroxide | 5.882 g |

This mixture is brought to reflux, while stirring, under a nitrogen atmosphere.

After 8 hours a viscous reddish solution results.

The resulting polymer is precipitated with petroleum ether, and dried. The copolymer is in the form of a red powder.

The yield of the reaction, by weight, is 80%.

The anhydride index of the resulting product is 572, the theoretical index being 500. It follows that the resulting copolymer comprises 42.8% by weight of isobutylvinyl ether and 57.2% of itaconic anhydride and has a molecular weight of 8000.

EXAMPLE 7

Preparation of a colorless methylacrylate - acrylic anhydride copolymer

The following ingredients are placed in a one-liter flask provided with agitating means, a reflux condenser, a thermometer, and a tube for introducing nitrogen:

| | |
|---|---|
| methylacrylate | 75 g |
| acrylic anhydride | 25 g |
| toluene | 300 cc |
| benzoyl peroxide | 5.882 g |

This mixture is heated gradually to reflux, while stirring, under a nitrogen atmosphere. After 8 hours, the result is a polymer in powder form, which is dried and washed with pentane, and again dried.

The copolymer is in the form of a white powder.

The yield of the reaction is 70%, by weight.

The anhydride index of the resulting product is 374, against a theoretical index of 500.

This indicates that the copolymer obtained comprises 58% by weight of methyl acrylate and 42% by weight of acrylic anhydride.

EXAMPLE 8

Preparation of a colored mixed semi-ester, semi-amide copolymer by condensing on a vinyl acetate/citraconic anhydride copolymer both n-butyl alcohol and a dye responding to the formula

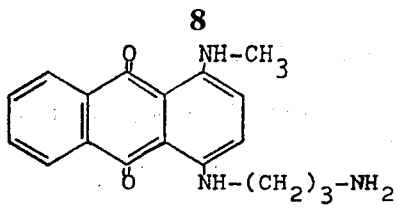

105 cc of distilled dioxane, 40 g (0.2 mol anhydride function) of a vinyl acetate/citraconic anhydride copolymer prepared as described in Example 5, 13.3 g (0.18 mol) of n-butanol, and 6.18 g (0.02 mol) of the above dye are introduced into a flask provided with agitating means, a thermometer and a condenser.

This mixture is heated at reflux for 16 hours. Esterification is completed by adding 15 g (0.2 mol) of n-butanol and the mixture is again heated to reflux for 7 hours.

After reaction, the colored copolymer is precipitated with dry ether. After drying, the result is an 86% yield, by weight, of a deep blue powder.

Analyses have shown that the yield in terms of amide bonding of the dye is 89.6%.

EXAMPLE 9

Preparation of a colored mixed semi-ester semi-amide copolymer by condensing on an isobutylvinyl ether/itaconic anhydride copolymer a dye responding to the formula

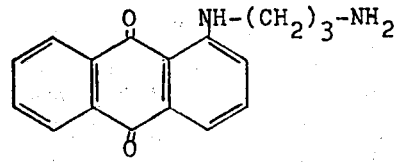

20 g (0.1 mol anhydride function) of isobutylvinyl ether/itaconic anhydride copolymer prepared as described in Example 6, 6.66 g (0.09 mol) of n-butanol and 2.8 g of (0.01 mol) of the above dye are introduced into a flask equipped with agitating means, a thermometer, and a reflux condenser.

This mixture is heated at reflux for 16 hours. Then esterification is completed by adding 7.4 g (0.1 mol) of n-butanol, and the mixture is again heated at reflux for 7 hours.

After condensation, the colored copolymer is precipitated with petroleum ether. After drying, the yield is 92% by weight of a red powder which is soluble in alcohol and in an aqueous solution of a lower alkanol.

Analyses have shown that the yield in terms of amide bonding of the dye is 93%

EXAMPLE 10

Preparation of a colored mixed semi-ester semi-amide copolymer by condensing on a methyl acrylate/acrylic anhydride copolymer, both n-butyl alcohol and a dye responding to the formula

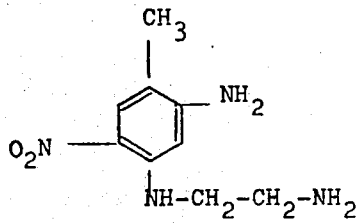

400 cc of dimethyl sulfoxide, 30 g (0.1 mol anhydride function) of a methylacrylate/acrylic anhydride copolymer (prepared as described in Example 7), 6.66 g (0.09 mol) of n-butanol and 2.1 g (0.01 mol) of the above dye are placed in a flask provided with agitating means, a reflux condenser, and a thermometer.

This mixture is heated at reflux for 16 hours. Esterification is completed by adding 7.4 g (0.1 mol) of n-butanol, and the mixture is again heated at reflux for seven hours.

At the end of the reaction, the colored copolymer is precipitated by adding water. The copolymer is redissolved in a mixture containing 1/3 dioxane and 1/3 dimethylformamide, and is again precipitated by adding ether.

After drying, the result is a 55% yield of an orange powder.

Analyses have shown that the yield in terms of amide bonding of the dye is 39.6%.

Colorless copolymers similar to those prepared in Examples 1, 2, 5, 6 and 7 can be prepared using essentially equivalent amounts of other of the above listed first monomers with other of the above listed second monomers. For instance, itaconic anhydride can be polymerized with vinyl acetate or methylacrylate; methacrylic anhydride can also be polymerized with vinylacetate, methylacrylate or isobutylvinylether; citraconic anhydride can also be polymerized with maleic anhydride, methylacrylate or isobutyl vinyl ether; and acrylic anhydride can also be polymerized with maleic anhydride, vinylacetate or isobutyl vinyl ether.

Further any of the above colorless copolymers can be condensed with any of the dyes disclosed herein and with n-butyl alcohol to produce colored copolymers employed in the hair setting lotion or hair lacquer compositions of this invention.

The following examples illustrate the hair setting lotion and hair lacquer compositions of the present invention using the aforementioned colored copolymers.

EXAMPLE A

A hair setting lotion composition according to the invention is prepared as follows:

| | | |
|---|---|---|
| Copolymer obtained as indicated in Example 3 | | 2g |
| triisopropanolamine | pH=7 | |
| ethyl alcohol | | 50 ml |
| water q.s.p. | | 100 ml |

This lotion is applied to naturally brown hair after shampooing, that is to say, to hair which has been moistened. The hair is then set in a conventional manner. The dry hair is shiny and a deep violet shade is obtained.

EXAMPLE B

A hair setting lotion according to the invention is prepared as follows:

| | | |
|---|---|---|
| Copolymer obtained as set forth in Example 8 | | 3 g |
| 2-amino- 2-methyl 1-propanol | pH=8 | |
| isopropyl alcohol | | 50 ml |
| water, q.s.p. | | 100 ml |

This lotion is applied to naturally chestnut hair which has been moistened and dried. The hair is then set in a conventional manner. After drying, the hair is bright and springy, and bright blue in color.

EXAMPLE C

A colored hair lacquer according to the invention is produced by first preparing the following solution:

| | |
|---|---|
| Copolymer obtained as set forth in Example 9 | 1.5 g |
| Copolymer obtained as set forth in Example 3 | 0.25 g |
| Gantrez AN 3152 - half ethyl ester of methylvinyl ether - maleic anhydride copolymer having a specific viscosity of 0.1-0.5 in a 1% solution in methyl ethyl ketone at 25°C | |
| 2-amino 2-methyl 1.3-propanediol q.s.p. | pH=6 |
| absolute ethyl alcohol q.s.p. | 100 g |

30 g of this mixture is packaged under pressure in an aerosol container with 43.8 g of the product sold under the trademark "Freon 11" (trichloromonofluoromethane) and 26.2 g of the product sold under the trademark "Freon 12" (dichlorodifluoromethane). When this is sprayed on the hair, the result is an auburn lacquer, which is very shiny and which tones down the yellow glints of the hair. It does not rub off on clothing or pillow slips, and may be easily removed by brushing and shampooing.

EXAMPLE D

A colored hair lacquer according to the invention is produced by first preparing the following solution:

| | |
|---|---|
| Copolymer obtained as set forth in Example 10 | 1.3 g |
| Copolymer obtained as set forth in Example 9 | 0.7 g |
| Gantrez AN 3152 (as in Example C) | 6 g |
| isopropanolamine q.s.p. pH=6.2 | |
| absolute ethyl alcohol | 100 g |

30 g of this solution are packaged under pressure in an aerosol container with 43.8 g of the product sold under the trademark "Freon 11" and 26.2 g of the product sold under the trademark "Freon 12".

When this hair lacquer is sprayed onto blond hair, the result is a lacquer having golden glints. This lacquer does not rub off on clothing or pillowcases, but can be easily removed by brushing and shampooing.

EXAMPLE E

A hair setting lotion composition according to the invention is prepared as follows:

| | |
|---|---|
| Copolymer obtained as indicated in Example 4 | 0.5 g |
| diethanolamine pH = 7 | |
| isopropyl alcohol | 20 ml |
| water, q.s.p. | 100 ml |

This lotion is applied to naturally brown hair after shampooing, that is to say, to hair which has been moistened. The hair is then set in a conventional manner. The dry hair is shiny and a deep violet shade is obtained.

EXAMPLE F

A hair setting lotion composition according to the invention is prepared as follows:

| | |
|---|---|
| Copolymer obtained as indicated in Example 4 | 6 g |
| diisopropanolamine pH = 7 | |
| ethyl alcohol | 70 ml |
| water q.s.p. | 100 ml |

This lotion is applied to naturally brown hair after shampooing, that is to say, to hair which has been moistened. The hair is then set in a conventional manner. The dry hair is shiny and a deep violet shade is obtained.

EXAMPLE G

A colored hair lacquer according to the invention is produced by first preparing the following solution:

| | |
|---|---|
| Copolymer obtained as set forth in Example 8 | 10 g |
| Gantrez AN 3152 (as in Example C) | 6 g |
| aminoethylpropanediol q.s.p. pH = 6.2 | |
| absolute ethyl alcohol | 100 g |

33 g of this solution are packaged under pressure in an aerosol container with 43.8 g of the product sold under the trademark "Freon 11" and 26.2 g of the product sold under the trademark "Freon 12".

When this hair lacquer is sprayed onto blond hair, the result is a lacquer having golden glints. This lacquer does not rub off on clothing or pillowcases, but can be easily removed by brushing and shampooing.

EXAMPLE H

A colored hair lacquer according to the invention is produced by first preparing the following solution:

| | |
|---|---|
| Copolymer obtained as set forth in Example 8 | 20 g |
| Gantrez AN 3152 (as in Example C) | 6 g |
| isopropanolamine q.s.p. pH = 6.2 | |
| absolute ethyl alcohol | 100 g |

25 g of this solution are packaged under pressure in an aerosol container with 43.8 g of the product sold under the trademark "Freon 11" and 26.2 g of the product sold under the trademark "Freon 12".

When this hair lacquer is sprayed onto blond hair, the result is a lacquer having golden glints. This lacquer does not rub off on clothing or pillowcases, but can be easily removed by brushing and shampooing.

Other hair setting lotion and hair lacquer compositions can also be prepared as indicated above using other colored copolymers also as described above with equally favorable results.

The hair setting lotion and hair lacquer compositions according to the invention can also contain other colored or colorless resins, as well as other conventional additives generally used in cosmetics, such as perfumes, surface-active agents, penetrating agents, or swelling agents.

What is claimed is:

1. A hair setting lotion composition comprising an aqueous lower alkanol solution of a colored copolymer of (A) a copolymer selected from the group consisting of a. 50 weight percent maleic anhydride and 50 weight percent itaconic anhydride,
   b. 75 weight percent maleic anhydride and 25 weight percent methacrylic anhydride,
   c. 43.7 weight percent vinyl acetate and 56.3 weight percent citraconic anhydride,
   d. 42.8 weight percent isobutylvinyl ether and 57.2 weight percent itaconic anhydride and
   e. 58 weight percent methylacrylate and 42 weight percent acrylic anhydride, said copolymer having a molecular weight ranging from about 600–8,000, and having condensed on a portion of the anhydride functions thereof (B) a dye having an extra nuclear radical, said dye being selected from the group consisting of (i) 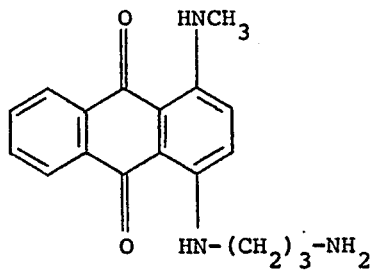

(ii) 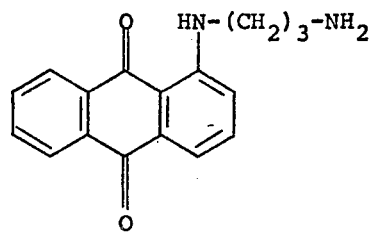

and (iii) 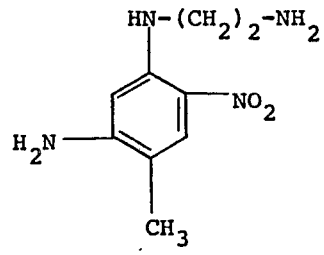

and being bonded to said copolymer by an amide bond through the terminal nitrogen atom of the extra nuclear radical, the amount of said dye condensed on said copolymer being sufficient to color said copolymer so that the resulting colored copolymer effectively colors said hair, said copolymer also having (C) n-butyl alcohol condensed on the remaining anhydride functions thereof said lower alkanol being present in amounts of about 20–70 weight percent of said composition, and said colored copolymer being present in amounts ranging from 0.5–6 weight percent of said composition.

2. The composition of claim 1 having a pH ranging from 6–8.

3. The composition of claim 1 wherein the amount of dye condensed on said copolymer ranges between about 2.75 to 9.5 percent by mole of the anhydride functions of said copolymer.

4. The composition of claim 1 wherein said lower alkanol is selected from the group consisting of ethanol and isopropanol.

5. A pressurized sprayable aerosol hair lacquer composition comprising under pressure a lower alkanol solution of a colored copolymer of (A) a copolymer selected from the group consisting of
 a. 50 weight percent maleic anhydride and 50 weight percent itaconic anhydride,
 b. 75 weight percent maleic anhydride and 25 weight percent methacrylic anhydride,
 c. 43.7 weight percent vinyl acetate and 56.3 weight percent citraconic anhydride,
 d. 42.8 weight percent isobutylvinyl ether and 57.2 weight percent itaconic anhydride and
 e. 58 weight percent methylacrylate and 42 weight percent acrylic anhydride,
said copolymer having a molecular weight ranging from about 600–8,000, said copolymer having condensed on a portion of the anhydride functions thereof (B) a dye having an extra nuclear radical, said dye being selected from the group consisting of (i) 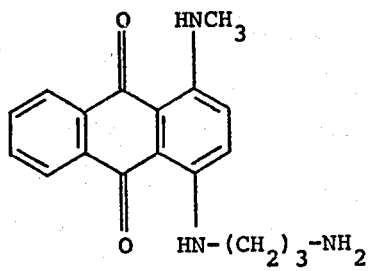

(ii) 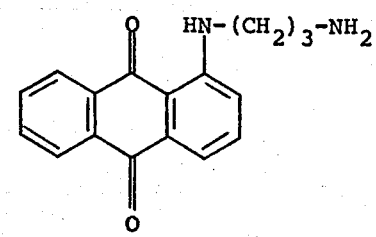

and (iii) 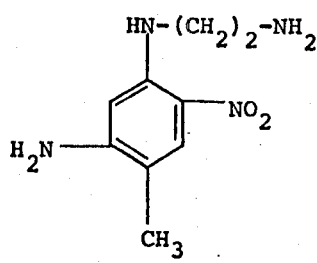

and being bonded to said copolymer by an amide bond through the terminal nitrogen atom of the extra nuclear radical, the amount of said dye condensed on said copolymer being sufficient to color said copolymer so that the resulting colored copolymer effectively colors said hair, said copolymer also having (C) n-butyl alcohol condensed on the remaining anhydride functions thereof, said colored copolymer being present in amounts of about 1.5–20 weight percent of said lower alkanol solution,
(2) an aerosol propellant, said lower alkanol solution of said colored copolymer being present in amounts of about 25–33 weight percent of said composition.

6. The composition of claim 5 having a pH ranging from 6–8.

7. The composition of claim 5 wherein the amount of dye condensed on said copolymer ranges between about 2.75 to 9.5 percent by mole to the anhydride functions of said copolymer.

8. The composition of claim 5 wherein the lower alkanol is selected from the group consisting of ethanol and isopropanol.

9. The composition of claim 5 wherein said aerosol propellant is selected from the group consisting of dichlorodifluoromethane, trichloromonofluoromethane and their mixtures.

* * * * *

UNITED STATES PATENT OFFICE
CERTIFICATE OF CORRECTION

Patent No. 3,915,635　　　　　　　　Dated October 28, 1975

Inventor(s) Gregoire Kalopissis and Andre Viout

It is certified that error appears in the above-identified patent and that said Letters Patent are hereby corrected as shown below:

In the Heading:

Under [30] Foreign Application Priority Data
　　"27753/71" should read --27753/67--

Signed and Sealed this

Tenth Day of August 1976

[SEAL]

Attest:

RUTH C. MASON
Attesting Officer

C. MARSHALL DANN
Commissioner of Patents and Trademarks